(12) United States Patent
Nishikawa

(10) Patent No.: US 6,778,472 B2
(45) Date of Patent: Aug. 17, 2004

(54) OPTICAL PICKUP WITH SWITCHABLE OPTICAL SYSTEMS ALONG AN OPTICAL PATH

(75) Inventor: Masayuki Nishikawa, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 492 days.

(21) Appl. No.: 09/870,882

(22) Filed: May 31, 2001

(65) Prior Publication Data

US 2002/0015364 A1 Feb. 7, 2002

(30) Foreign Application Priority Data

May 30, 2000 (JP) ......................................... 2000-161259

(51) Int. Cl.$^7$ .............................................. G11B 7/095
(52) U.S. Cl. .............................. 369/44.21; 369/53.22; 369/112.24
(58) Field of Search ........................ 369/44.21, 112.24, 369/53.2, 53.22, 44.23, 244

(56) References Cited

U.S. PATENT DOCUMENTS

| | | | |
|---|---|---|---|
| 5,235,581 A | * 8/1993 | Miyagawa et al. | 369/44.12 |
| 5,729,510 A | * 3/1998 | Kasahara et al. | 369/44.14 |
| 5,781,519 A | * 7/1998 | Ishika et al. | 369/53.2 |
| 5,949,744 A | * 9/1999 | Lee | 369/44.17 |
| 5,986,984 A | * 11/1999 | Nakamura et al. | 369/44.23 |
| 6,134,195 A | * 10/2000 | Kawamura | 369/44.23 |
| 6,229,778 B1 | * 5/2001 | Ikegame et al. | 369/53.22 |
| 6,266,301 B1 | * 7/2001 | Morimoto | 369/44.23 |
| 6,314,064 B1 | * 11/2001 | Ueda et al. | 369/44.23 |

FOREIGN PATENT DOCUMENTS

| | | |
|---|---|---|
| JP | 11120587 | 4/1999 |
| JP | 11-154341 | 6/1999 |
| JP | 2000-030272 | 1/2000 |

* cited by examiner

Primary Examiner—W. R. Young
Assistant Examiner—Peter Vincent Agustin
(74) Attorney, Agent, or Firm—David G. Conlin; David A. Tucker; Edwards & Angell, LLP

(57) ABSTRACT

An optical pickup apparatus includes a first optical system for recording or reproducing signals to or from a first optical recording medium; a second optical system for recording or reproducing signals to or from a second optical recording medium; a holder for accommodating the first optical system and the second optical system on substantially the same plane; a focusing driving device for moving the holder in a first direction parallel to an optical axis of the first optical system and the second optical system; a tracking driving device for rotating the holder in a second direction perpendicular to the optical axis of the first optical system and the second optical system; a switching device for placing the first optical system on an optical path for recording or reproducing signals to or from the first optical recording medium, and for placing the second optical system on the optical path for recording or reproducing signals to or from the second optical recording medium; and a variable distance driving device for varying a distance between the first optical recording medium and the first optical system from a distance between the second optical recording medium and the second optical system when one of the first optical system and the second optical system is switched to the other optical system.

7 Claims, 9 Drawing Sheets

OPTICAL PICKUP WITH SWITCHABLE OPTICAL SYSTEMS ALONG AN OPTICAL PATH

BACKGROUND OF THE INVENTION

1. Field of the Invention

The present invention relates to an optical pickup apparatus used in an optical head apparatus or an optical disk apparatus for recording or reproducing data to or from an optical recording medium such as, for example, an optical disk or a magneto-optical disk.

2. Description of the Related Art

Conventionally, an optical recording medium or a disk is used for storing video and audio information or computer data. In recent years, there has been a strong demand for a higher density and larger capacity optical recording medium.

The recording density of a recording medium can be improved by, for example, increasing a numerical aperture (hereinafter, referred to as an "NA") of an objective lens provided in the optical pickup apparatus or shortening the wavelength of light emitted by a laser device provided as a light source. However, increasing the NA of the objective lens requires a distance from the objective lens to the recording medium to be reduced. The objective lens having a high NA has larger aberration than an objective lens having a low NA. The aberration is caused by a tilt of the recording medium with respect to the objective lens. Under such circumstances, there has been proposed a method of reducing the thickness of a glass cover of the recording medium so as to reduce the aberration, so that recording or reproduction of data to or from such a recording medium is performed using an objective lens having a high NA and light having a shorter wavelength.

However, it is difficult to reproduce information from conventional CDs, DVDs or other types of disks using an objective lens having a high NA since the conventional disks are designed to have data stored thereon reproduced using an objective lens having a low NA. Accordingly, in order to reproduce data stored on the conventional CDs or DVDs in an optical pickup apparatus designed for a high-density, large-capacity disks, the optical pickup apparatus needs to include an objective lens having a low NA for the conventional CDs or DVDs in addition to an objective lens having a high NA.

FIG. 14 shows an optical pickup apparatus 300 disclosed in Japanese Laid-Open Publication No. 11-120587. The optical pickup apparatus 300 includes a holder 55. The holder 55 accommodates a first optical system 52 having a high NA including a first objective lens 50 and a second objective lens 51, and a second optic system having a low NA, i.e., a third objective lens 53 (the second optical system will sometimes be indicated by reference numeral "53" for the sake of convenience). The first optical system 52 is provided for recording or reproducing data to or from a first disk 71, and the second optical system 53 is provided for recording or reproducing data to or from a second disk 70. The optical pickup apparatus 300 uses the first optical system 52 or the second optical system 53 in accordance with which of the disk 70 or 71 is used. Since the first optical system 52 and the second optical system 53 have different NAs from each other, the first objective lens 50 and the third objective lens 53 are located so as to be away from the first disk 71 and from the second disk 70 by different distances.

The conventional optical pickup apparatus 300 having such a structure involves the following problems.

(1) The difference between the distance from the first objective lens 50 to the first disk 71 and the distance from the third objective lens 53 to the second disk 70 are adjusted to be set distances, respectively, by the position of the holder 55. Accordingly, when the second optical system having a low NA (i.e., the third objective lens 53) becomes uncontrollable in the direction of an optical axis thereof while the second disk 70 is being used for recording or reproduction (i.e., the second optical system 53 is used), the first optical system 52 may possibly collide against the second disk 70 resulting in the second disk 70 or the fist optical system 52 being damaged.

(2) In the case where the third objective lens 53 (i.e., the second optical system having a low NA) and the first objective lens 50 included in the first optical system 52 having a high NA are located on substantially the same plane, the following problems occur. The distance between the first disk 71 and the first optical system 52 which is required to record or reproduce data to or from the first disk 71 is significantly different from the distance between the second disk 70 and the second optical system 53 which is required to record or reproduce data to or from the second disk 70. Therefore, when the first optical system 52 is switched to the second optical system 53 or vice versa, the holder 55 needs to be moved a distance which is too far to guarantee an appropriate tilt of the disk with respect to the respective objective lens.

"(3) In the above-described case, a DC current needs to be continuously supplied to the holder 55 in order to move the holder 55 to a prescribed position to obtain the required distance from the optical system and the objective lens. This increases the power consumption."

SUMMARY OF THE INVENTION

An optical pickup apparatus according to the present invention includes a first optical system for recording or reproducing signals to or from a first optical recording medium; a second optical system for recording or reproducing signals to or from a second optical recording medium; a holder for accommodating the first optical system and the second optical system on substantially the same plane; a focusing driving device for moving the holder in a first direction parallel to an optical axis of the first optical system and the second optical system; a tracking driving device for rotating the holder in a second direction perpendicular to the optical axis of the first optical system and the second optical system; a switching device for placing the first optical system on an optical path for recording or reproducing signals to or from the first optical recording medium, and for placing the second optical system on the optical path for recording or reproducing signals to or from the second optical recording medium, and a variable distance driving device for varying a distance between the first optical recording medium and the first optical system from a distance between the second optical recording medium and the second optical system when one of the first optical system and the second optical system is switched to the other optical system.

In one embodiment of the invention, the variable distance driving device drives the holder in a direction of the optical axis.

In one embodiment of the invention, the variable distance driving device drives the holder in the direction of the optical axis by a magnetic repulsive force.

In one embodiment of the invention, the variable distance driving device drives the holder in the direction of the optical axis by the magnetic repulsive force when the holder is not moving in the second direction or when one of the first optical system and the second optical system is switched to the other optical system.

In one embodiment of the invention, the variable distance driving device drives the holder in the direction of the optical axis by a magnetic attractive force.

In one embodiment of the invention, the variable distance driving device drives the holder in the direction of the optical axis by the magnetic attractive force when the holder is not moving in the second direction or when one of the first optical system and the second optical system is switched to the other optical system.

In one embodiment of the invention, the variable distance driving device moves the holder when the first optical recording medium or the second optical recording medium is mounted on the optical disk apparatus such that a distance from the recording medium to the holder is larger than a prescribed distance from the second recording medium to the holder when the second optical system is located in the optical path.

Thus, the invention described herein makes possible the advantages of providing an optical pickup apparatus which prevents collision between a disk and an objective lens when the required distance between the disk and the objective lens is different depending on the disk to be used, and thus is usable for recording or reproducing data to or from optical recording media of a plurality of different specifications.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
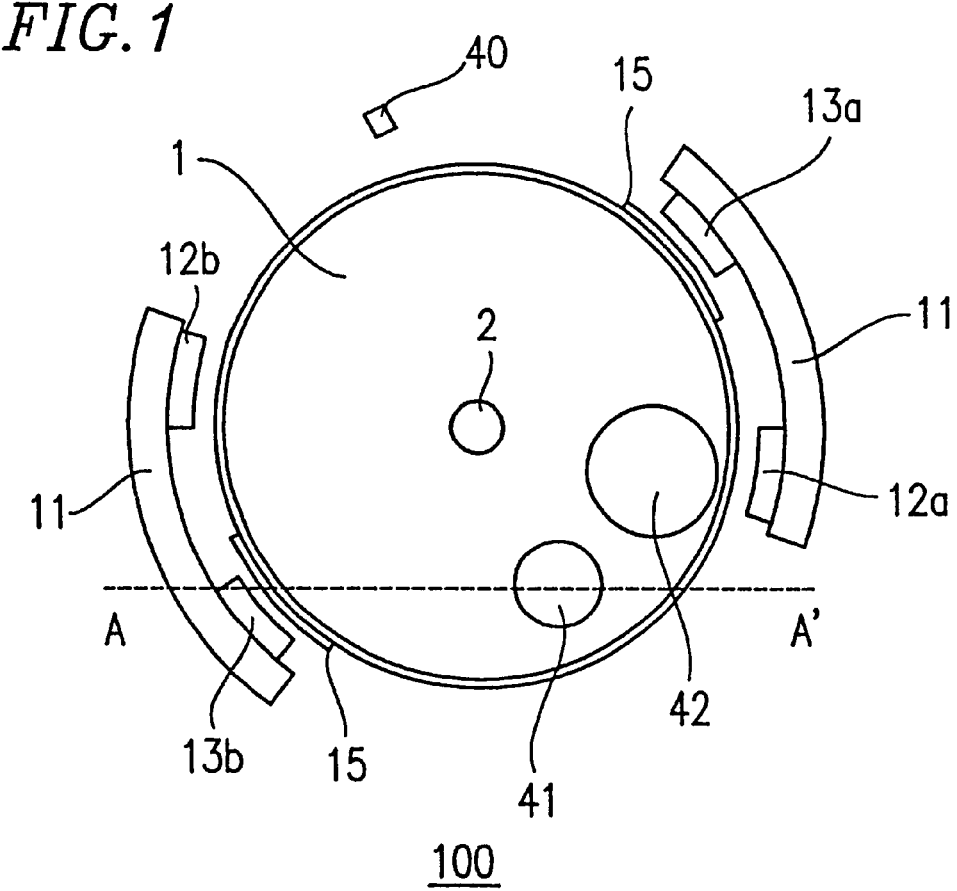
"FIG. 1 is a top view of an optical pickup apparatus 100 according to Example 1 of the present invention in the state where a first optical system is Located in the optical path;"
Figure 2:
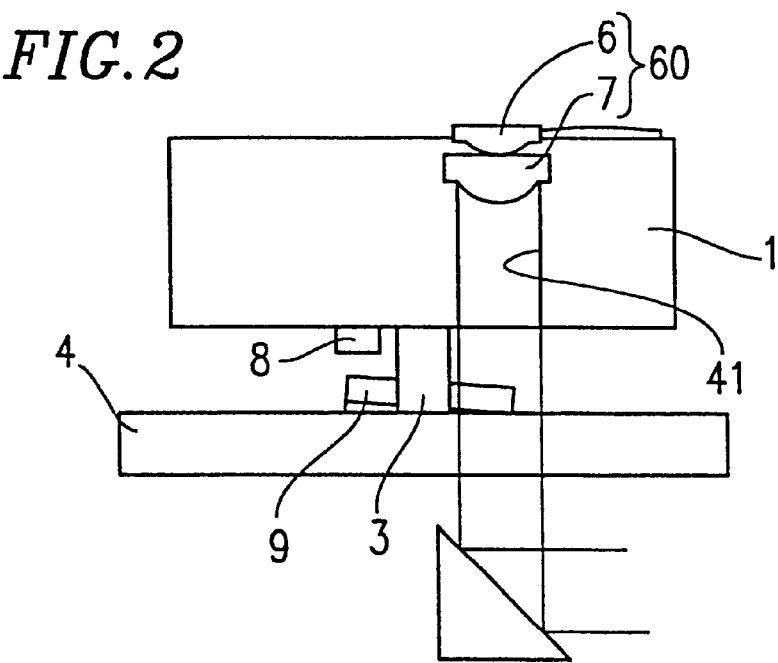
FIG. 2 is a cross-sectional view of the optical pickup apparatus 100 taken along line A–A' in FIG. 1.
Figure 4:
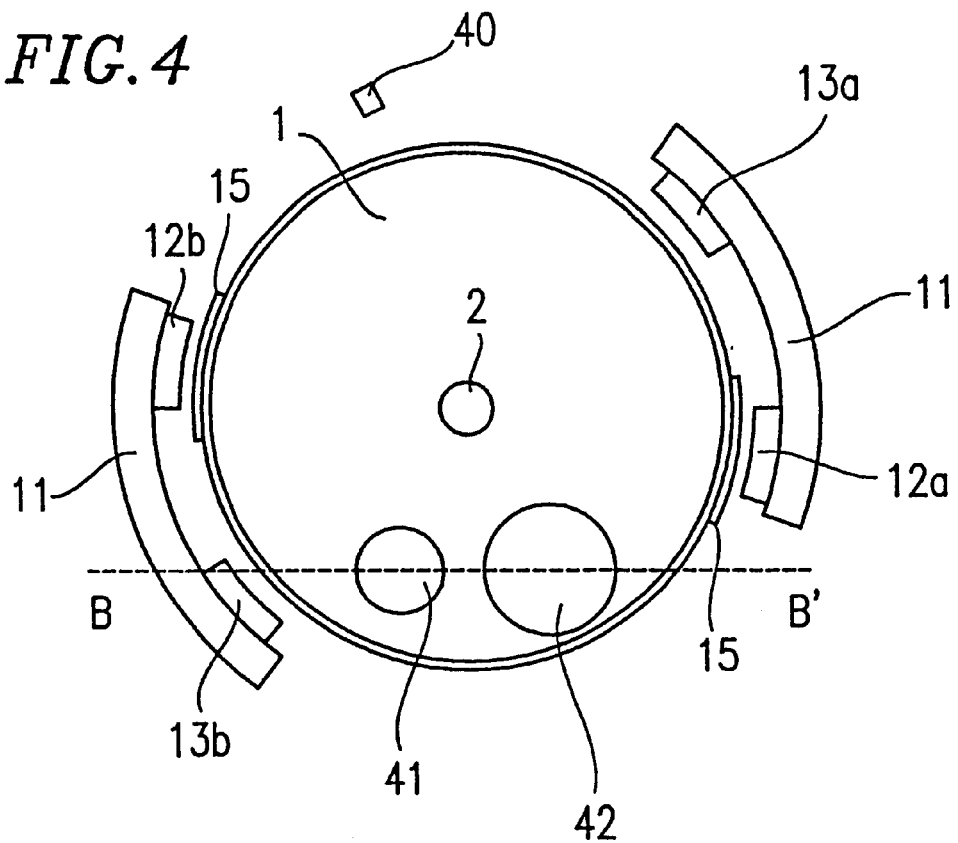
FIGS. 4 is a top view of the optical pickup apparatus 100 of Example 1 in the state where a second optical system is located in the optical path.
Figure 5:
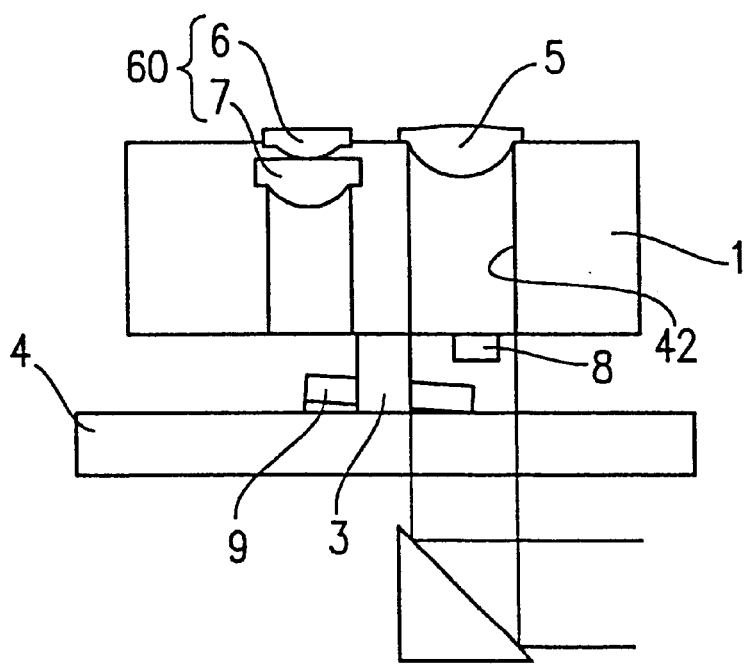
FIG. 5 is a cross-sectional view of the optical pickup apparatus 100 taken along line B–B' in FIG. 4.

FIGS. 1 and 4 are top views of an optical pickup apparatus 100 according to Example 1 of the present invention. FIG. 2 is a cross-sectional view of the optical pickup apparatus 100 taken along line A–A' of FIG. 1. FIG. 1 shows the optical pickup apparatus 100 in the state where a first optical system 60 (FIG. 2) is on an optical path of light from a laser device provided as a light source (not shown). FIG. 5 is a cross-sectional view of the optical pickup apparatus 100 taken along line B–B' of FIG. 4. FIG. 4 shows the optical pickup apparatus 100 in the state where a second optical system 5 (FIG. 5) is on the optical path.

As shown in FIG. 1, the optical pickup 100 includes a holder 1 having two through-holes 41 and 42 for allowing laser light to pass therethrough. The first optical system 60 is provided in the through-hole 41 as shown in FIG. 2, and the second optical system 5 is provided in the through-hole 42 as shown in FIG. 5.

Figure 7:
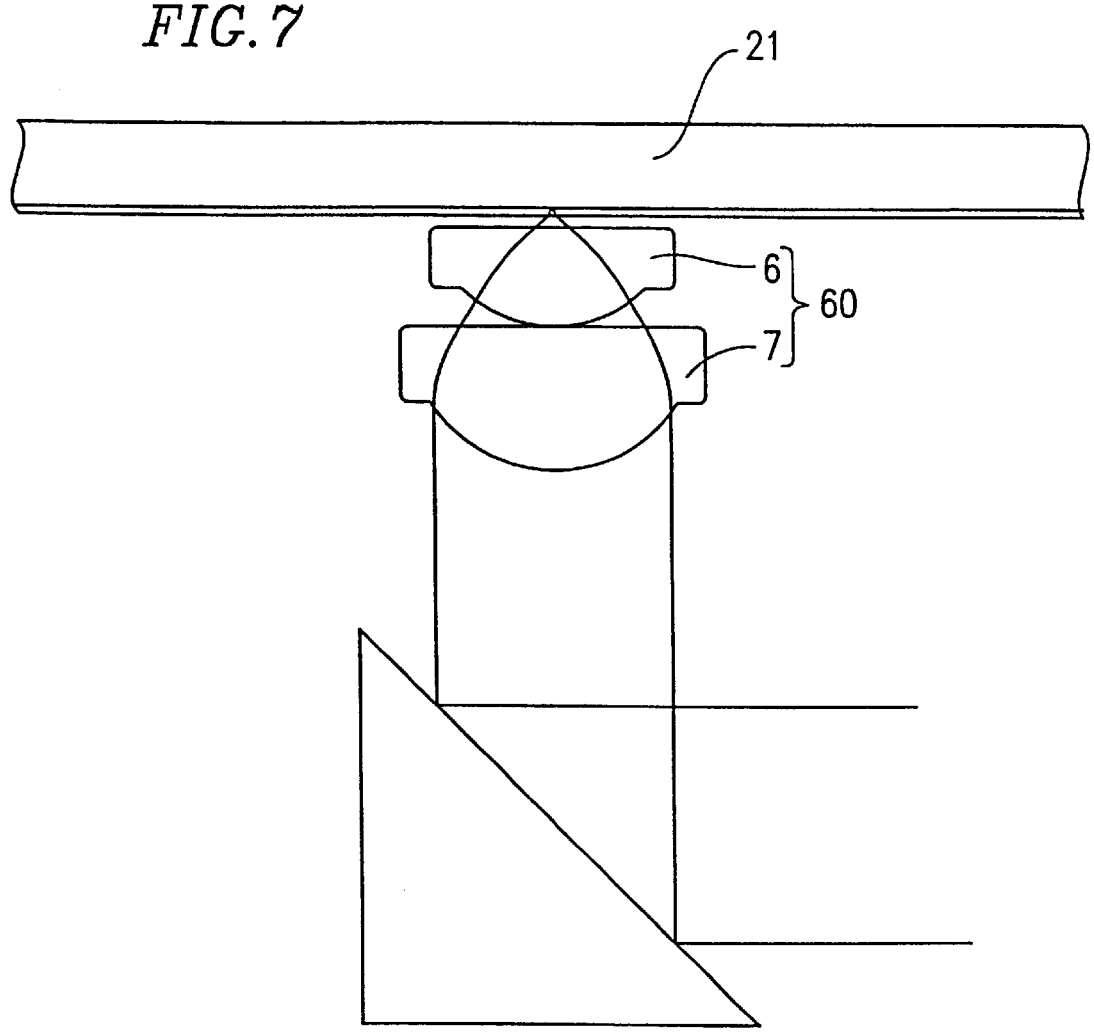
FIG. 7 illustrates an operation of the first optical system of the optical pickup apparatus 100.

FIG. 7 shows an operation of the first optical system 60. With reference to FIG. 7, the first optical system 60 will be described.

The first optical system 60 includes a first objective lens 6 and a second objective lens 7. The first objective lens 6 is closer to a first disk 21, and the second objective lens 7 is closer to the laser device (not shown). The first optical system 60 is used to record and reproduce data or signals to and from the first disk 21. For example, the first disk 21 includes a glass cover having a thickness of about 0.1 mm, the light from the laser device has a wavelength of 405 nm, and the total NA of the first and second objective lenses 6 and 7 is about 0.85, which is suitable for a wavelength of 405 nm. The distance from the first disk 21 to the first objective lens 6 is set to be about 0.1 mm for recording or reproduction.

Figure 8:
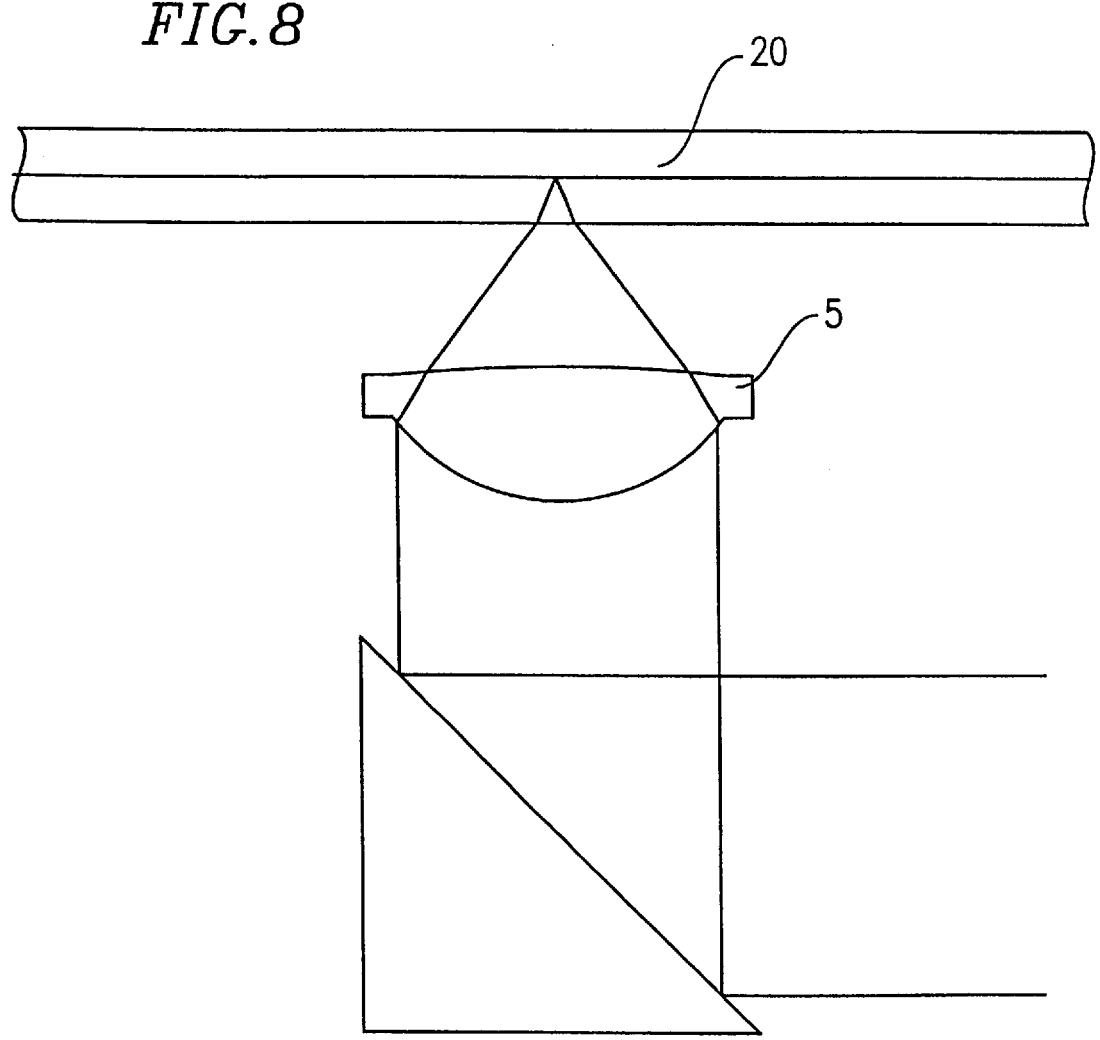
FIG. 8 illustrates an operation of the second optical system of the optical pickup apparatus 100.

FIG. 8 shows an operation of the second optical system 5. With reference to FIG. 8, the second optical system 5 will be described.

The second optical system 5 includes a third objective lens (the third lens will sometimes be indicated by reference numeral "5" for the sake of convenience). The second optical system 5 is used to reproduce data from the second disk 20 or to both record and reproduce data to and from the second disk 20. For example, the second disk 20 includes a glass cover having a thickness of about 0.6 mm, the light from the laser device has a wavelength of 650 nm, and the NA of the third objective lens 5 is about 0.6, which is suitable for a wavelength of 650 nm. The distance from the second disk 20 to the third objective lens 5 is set to be about 1.8 mm for recording or reproduction.

As described above, the distance between the first optical system 60 (specifically, the first lens 6) and the first disk 21 is different from the distance between the second optical system 5 (i.e., the third lens) and the second disk 20. In this example, the difference in the distances is about 1.7 mm.

Figure 3:
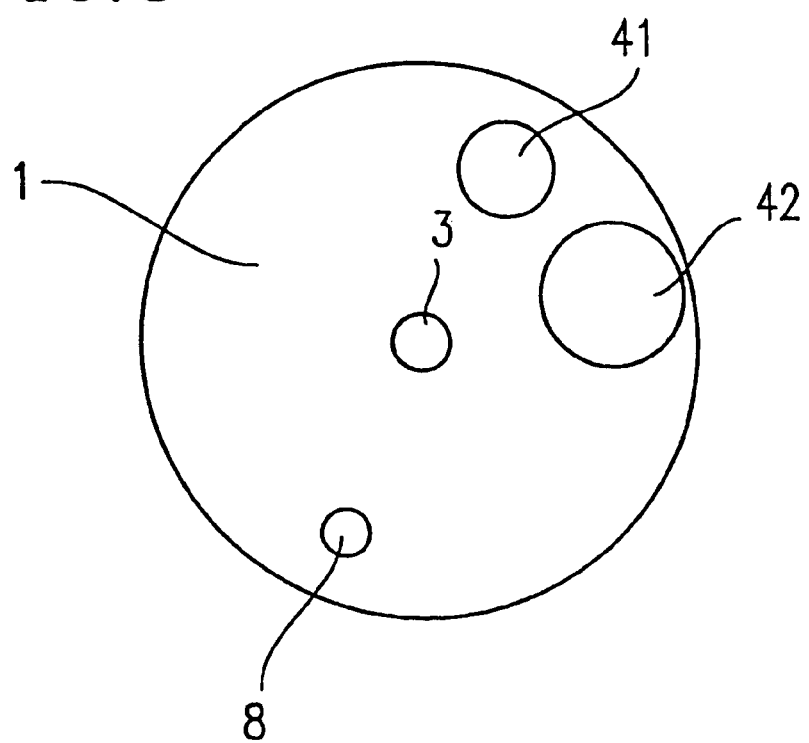
FIG. 3 is a bottom view of a holder included in the optical pickup apparatus 100 shown in FIG. 1.
Figure 6:
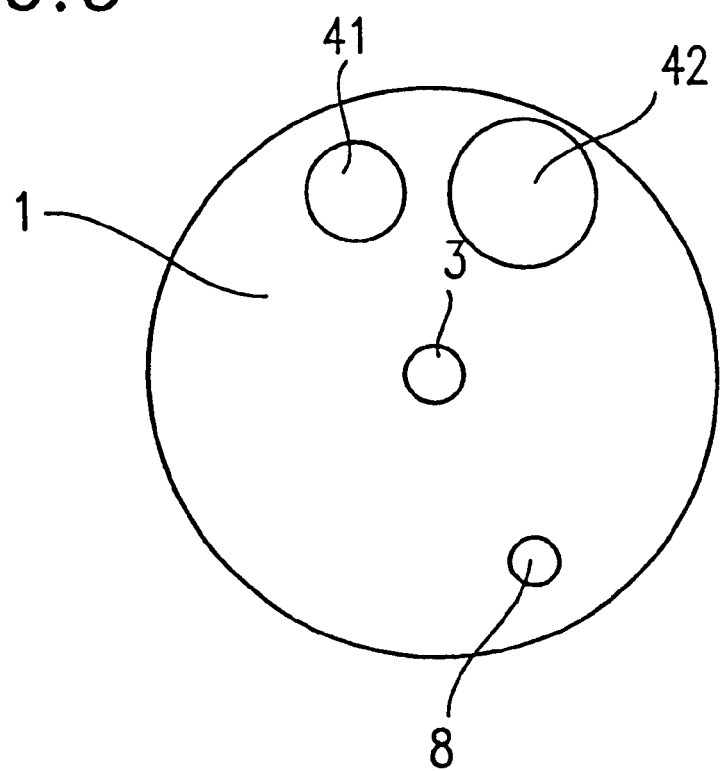
FIG. 6 is a bottom view of the holder included in the optical pickup apparatus 100 shown in FIG. 4.

"FIG. 3 is a bottom view of the holder 1 in the state shown in FIG. 1, and FIG. 6 is a bottom view of the holder 1 in the state shown in FIG. 4. Hereinafter, the holder 1 will be described. The holder 1 has a through-hole 2 at the center thereof. The through-hole 2 is made in the direction of the optical axis of the first optical system 60 and the second optical axis 5. As shown in FIG. 2, a sliding shaft 3 extends throughout the through-hole 2 in the direction of the optical axis. The sliding shaft 3 is attached to an actuator support 4 substantially perpendicular thereto."

The holder 1 rotates about the sliding shaft 3 so as to realize tracking control of the first disk 21 and the second disk 20. The holder 1 also moves in the direction of the optical axis along the sliding shaft 3 so as to realize focusing control of the first disk 21 and the second disk 20. The rotation of the holder 1 about the sliding shaft 3 also places the first optical system 60 or the second optical system 5 on the optical path in a switching manner.

Figure 9:
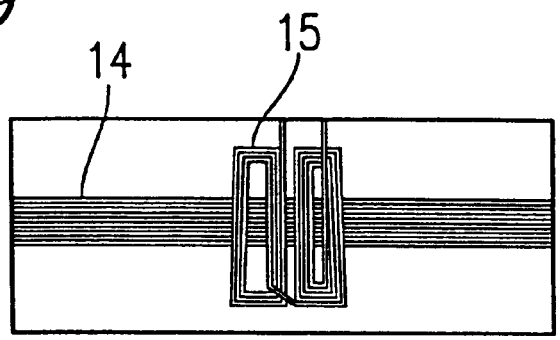
FIG. 9 is a side view of the holder of the optical pickup apparatus 100.

FIG. 9 is a side view of the holder 1. A focusing coil 14 and a tracking coil 15 are fixedly provided on a side circumferential surface of the holder 1. The focusing coil 14 is wound around the side circumferential surface of the holder 1 about the optical axis, and the tracking coil 15 is wound in the direction parallel to the optical axis. As can be appreciated from FIGS. 1 and 4, the side circumferential surface of the holder 1 extends parallel to the optical axis.

Referring to FIG. 4, the optical pickup apparatus 100 includes first magnets 12a and 12b, and second magnets 13a and 13b. The first magnets 12a and 12b are respectively attached to two opposing yokes 11, provided along the holder 1, so as to generate a high magnetic flux density in the tracking coil 15 when the second optical system 5 is located on the optical path. The first magnets 12a and 12b are each provided with a gap from the tracking coil 15. The magnetization direction of the first magnets 12a and 12b is in the direction of a straight line which is perpendicular to the optical axis and connects the first magnets 12a and 12b with the sliding shaft 3.

When the tracking coil 15 is provided with an electric power in this state, a Lorentz force is generated in the holder 1 in the direction perpendicular to the optical axis. Then, the holder 1 rotates about the sliding shaft 3 so as to realize tracking control of the second disk 20. When the focusing coil 14 is provided with an electric power in this state, a Lorentz force is generated in the holder 1 in the direction parallel to the optical axis. Then, the holder 1 is driven along the sliding shaft 3 to realize the focusing control of the second disk 20.

Referring to FIG. 1, the second magnets 13a and 13b are respectively attached to the yokes 11 so as to generate a high magnetic flux density in the tracking coil 15 when the first optical system 60 is located on the optical path. The second magnets 13a and 13b are each provided with a gap from the tracking coil 15. The magnetization direction of the second magnets 13a and 13b is in the direction of a straight line which is perpendicular to the optical axis and connects the second magnets 13a and 13b with the sliding shaft 3.

When the tracking coil 15 is provided with an electric power in this state, a Lorentz force is generated in the holder 1 in the direction perpendicular to the optical axis. Then, the holder 1 rotates about the sliding shaft 3 so as to realize tracking control of the first disk 21. When the focusing coil 14 is provided with an electric power in this state, a Lorentz force is generated in the holder 1 in the direction parallel to the optical axis. Then, the holder 1 is driven along the sliding shaft 3 to realize the focusing control of the first disk 21.

When the first optical system 60 and the second optical system 5 require different magnitudes of thrust for tracking control, the first magnets 12a and 12b and the second magnets 13a and 13b may be adjusted to have different magnetic flux densities.

As shown in FIGS. 1 and 4, the optical pickup apparatus 100 can include a position sensor 40 formed of a photo interrupter or the like. The position sensor 40 may be used to detect whether the first optical system 60 or the second optical system 5 is located on the optical path and thus appropriately control the value of an electric current to be supplied to the tracking coil 15.

Next, a variable distance driving device for varying the distance from the disk to the optical system when the first optical system 60 is switched to the second optical system 5 or vice versa will be described. The variable distance driving device includes a third magnet 8 and a fourth magnet 9.

As shown in FIGS. 3 and 6, the optical pickup apparatus 100 includes the third magnet 8 on a bottom surface of the holder 1. The bottom surface extends vertically with respect to the optical axis, and the light from the laser device is incident on the bottom surface. The magnetization direction of the third magnet 8 is parallel to the optical axis. As shown in FIGS. 2 and 5, the optical pickup apparatus 100 includes the fourth magnet 9 on a surface of the actuator support 4. The surface of the actuator support 4 having the fourth magnet 9 extends vertically with respect to the optical axis and faces the holder 1. The fourth magnet 9 is inclined with respect to the optical axis.

Figure 10:
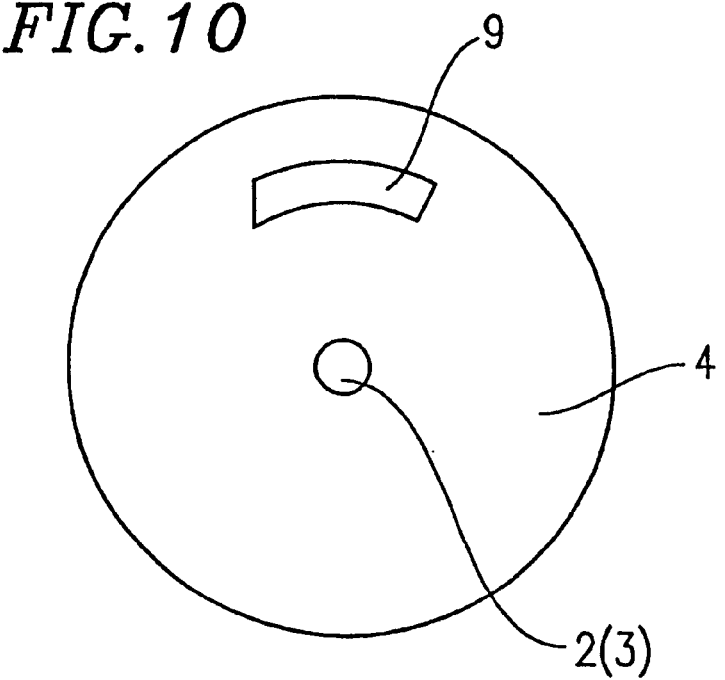
FIG. 10 is a top view showing a variable distance driving device including a magnet of the optical pickup apparatus 100.

FIG. 10 is a top view of the actuator support 4 having the fourth magnet 9 thereon. The fourth magnet 9 has the shape of an arc having the sliding shaft 3 as the center. The magnetization direction of the fourth magnet 9 is parallel to the optical axis. The magnetization direction of the fourth magnet 9 is opposite to the magnetization direction of the third magnet 8.

The variable distance driving device operates as follows for performing recording to or reproduction from the first disk 21 using the first optical system 60. In this case, as shown in FIG. 2, the third magnet 8 and the fourth magnet 9 face each other in the direction parallel to the optical axis. Accordingly, a magnetic repulsive force between the third magnet 8 and the fourth magnet 9 is generated in the direction parallel to the optical axis, and the magnetic repulsive force acts as a thrust to move the holder 1 in the direction of the optical axis. The holder 1 moves along the sliding shaft 3 in the direction of the optical axis until the distance between the first disk 21 and the first lens 6 of the first optical system 60 reaches a prescribed distance.

The variable distance driving device operates as follows for performing recording to or reproduction from the second disk 20 using the second optical system 5. In this case, as shown in FIG. 5, the third magnet 8 and the fourth magnet 9 face each other in the direction parallel to the optical axis. Accordingly, a magnetic repulsive force between the third magnet 8 and the fourth magnet 9 is generated in the direction parallel to the optical axis, and the magnetic repulsive force acts as a thrust to move the holder 1 in the direction of the optical axis. The holder 1 moves along the sliding shaft 3 in the direction of the optical axis until the distance between the second disk 20 and the third lens of the second optical system 5 reaches a prescribed distance.

As described above, the fourth magnet 9 is inclined with respect to the optical axis. Since the distance between the third magnet 8 and the fourth magnet 9 is kept the same while the first optical system 60 is switched to the second optical system 5 or vice versa, the distance between the first optical system 60 and the first disk 21 is different from the distance between the second optical system 5 and the second disk 20. In this manner, the distance between each disk and the respective optical system can be set to a value appropriate to the disk by the angle of inclination.

While the first optical system 60 is switched to the second optical system 5 or vice versa, the repulsive force is still acting between the third magnet 8 and the fourth magnet 9. Therefore, the thrust for moving the holder 1 in the direction of the optical axis is kept the same during such a switching operation. Consequently, the vibration of the holder 1 in the direction of the optical axis is sufficiently small to prevent a collision of the lens and the disk.

When the first disk 21 or the second disk 20 is mounted on the optical pickup apparatus 100, the second optical system 5 is preferably located on the optical axis. An electric current is supplied to the focusing coil 14 so as to move the holder 1 in the direction of the optical axis toward the laser device until the distance between the holder 1 and the first or second disk 21 or 20 which has just been mounted becomes equal to or greater than a prescribed distance between the disk 20 and the holder 1 required for recording or reproduction of data to or from the second disk 20. The holder 1 is paused at that position by continuously supplying the electric current to the focusing coil 14. Such an operation prevents the disk from colliding against the objective lens or the holder 1 when the first disk 21 or the second disk 20 is mounted on the optical pickup apparatus 100.

EXAMPLE 2

Figure 11:
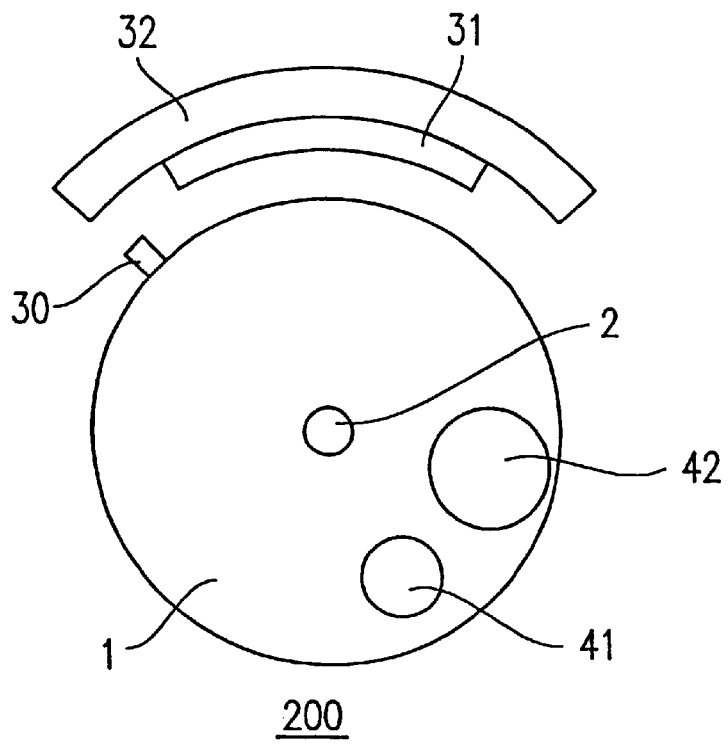
FIG. 11 is a top view of an optical pickup apparatus 200 according to Example 2 of the present invention in the state where a first optical system is located in an optical path.
Figure 12:
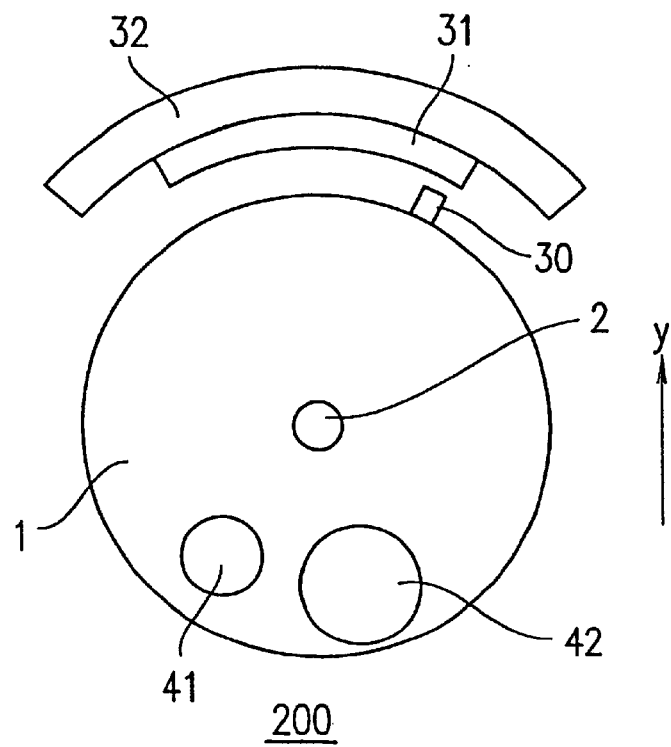
FIG. 12 is a top view of the optical pickup apparatus 200 of Example 2 in the state where a second optical system is located in the optical path.

FIGS. 11 and 12 are top views of an optical pickup apparatus 200 according to Example 2 of the present invention. FIG. 11 shows the optical pickup apparatus 200 in the state where a first optical system is on an optical path of light from a laser device as a light source (not shown). FIG. 12 shows the optical pickup apparatus 200 in the state where a second optical system is on the optical path.

Identical elements previously discussed with respect to FIGS. 1 through 10 bear identical reference numerals and the detailed descriptions thereof will be omitted. For example, although not shown, the optical pickup apparatus 200 includes a focusing coil 14 and a tracking coil 15 provided on a side circumferential surface of the holder 1. The focusing control and the tracking control are performed in a manner similar to that of Example 1. Although the first optical system, the second optical system, the first disk and the second disk are not shown in FIG. 11 or 12, these elements are represented by the identical reference numerals as those used in Example 1.

As shown in FIGS. 11 and 12, the optical pickup apparatus 200 includes a fifth magnet 30 on the side circumferential surface of the holder 1. As can be appreciated from FIGS. 11 and 12, the side circumferential surface of the holder 1 extends parallel to the optical axis. The fifth magnet 30 is provided for varying the distance between the disk which is to be used and the optical system when the first optical system 60 is switched to the second optical system 5 or vice versa. The magnetization direction of the fifth magnet 30 is in the direction of a straight line which is perpendicular to the optical axis and connects the fifth magnet 30 and the sliding shaft 3. The optical pickup apparatus 200 also includes a base 32 provided along the holder 1 with a gap from the holder 1. The base 32 also extends parallel to the optical axis. A magnetic member 31 is provided on the base 32.

Figure 13:
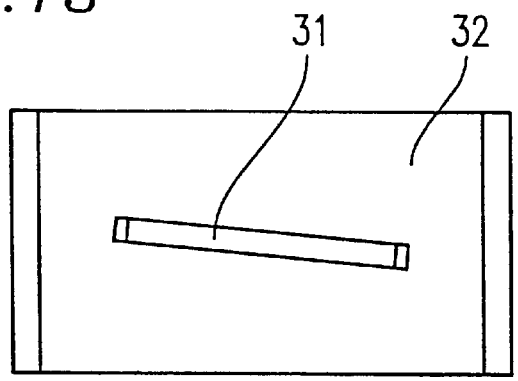
FIG. 13 is a side view of the optical pickup apparatus 200 seen in the direction of arrow y in FIG. 12.
Figure 14:
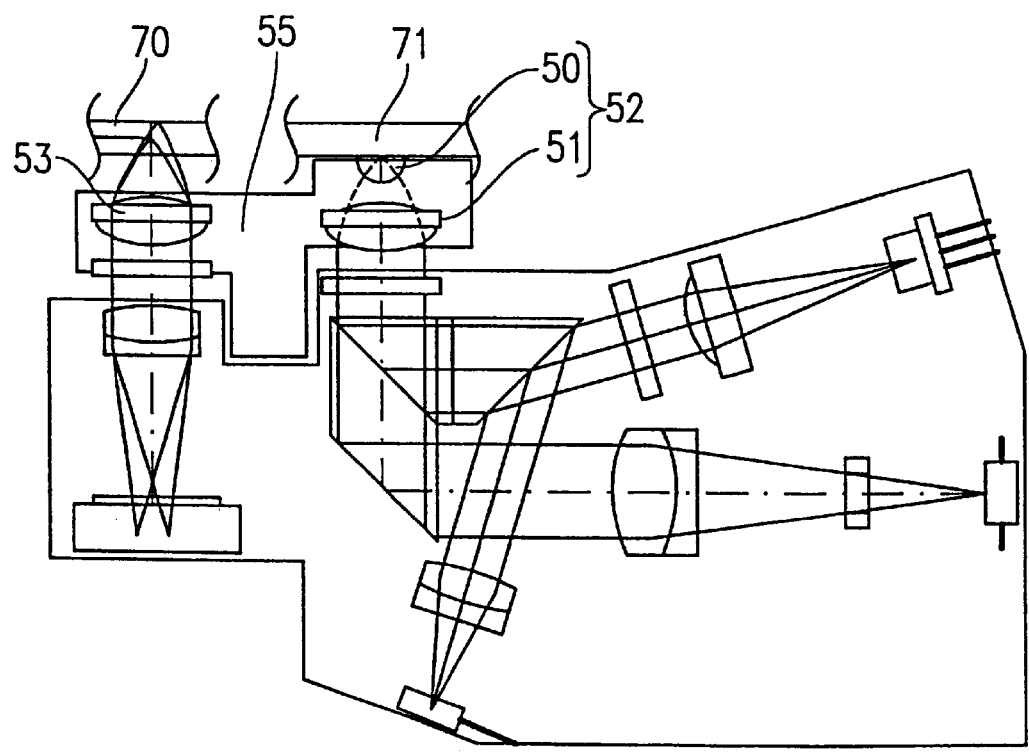
FIG. 14 is a schematic view of a conventional optical pickup apparatus 300.

"The magnetic member 31 is formed of, for example, iron or silicon-iron alloy. An attractive force is generated between the fifth magnet 30 and the magnetic member 31. FIG. 13 is a side view of the optical pickup apparatus 200 seen in the direction of arrow y in FIG. 12. As shown in FIG. 13, the magnetic member 31 is provided in an inclining manner so that the first optical system 60 and the second optical system 5 are away from the respective disks by different distances when each optical system is on the optical path. Accordingly, the distance between the first optical system 60 and a first disk 21 and the distance between the second optical system 5 and a second disk 20 can be each set at a value appropriate to the respective disk."

While the first optical system 60 is switched to the second optical system 5 or vice versa, the attractive force is still acting between the fifth magnet 30 and the magnetic member 31. Therefore, the thrust for moving the holder 1 in the direction of the optical axis is kept the same during such a switching operation. Consequently, the vibration of the holder 1 in the direction of the optical axis is sufficiently small to prevent the collision of the lens and the disk.

The fifth magnet 30 can be replaced with a magnetic member, in which case, the magnetic member 31 can be replaced with a magnet. The magnetic member 31 can be replaced with a magnet while the fifth magnet 30 is used as it is.

Like in Example 1, when the first disk 21 or the second disk 20 is mounted on the optical pickup apparatus 200, the second optical system 5 is preferably located on the optical axis. An electric current is supplied to the focusing coil 14 so as to move the holder 1 in the direction of the optical axis toward the laser device until the distance between the holder 1 and the first or second disk 21 or 20 which has just been mounted becomes equal to or greater than a prescribed distance between the disk 20 and the holder 1 required for recording or reproduction of data to or from the second disk 20. The holder 1 is paused at that position by continuously supplying the electric current to the focusing coil 14. Such an operation prevents the disk from colliding against the objective lens or the holder 1 when the first disk 21 or the second disk 20 is mounted on the optical pickup apparatus 200.

As described above in detail, according to the optical pickup apparatus of the present invention, when the first optical system is switched to the second optical system or vice versa, the distance between the disk or the optical recording medium which is to be used for recording or reproduction and the respective optical system (objective lens or lenses) is varied in accordance with the type of the disk. Due to such a structure, the disk and the lens are prevented from colliding against each other even when disks of a plurality of different specifications are required to be away from the respective, optical systems by different distances. Thus, the optical pickup apparatus is usable for recording or reproducing data to or from optical recording media of a plurality of different specifications.

In one embodiment of the invention, only the holder is moved in the direction of the optical axis. Thus, the distance between the disk and the optical system can be varied in accordance with the type of the disk by a simple mechanism. The production cost of the optical pickup apparatus can be reduced.

In one embodiment of the invention, the distance between the disk and the optical system which is appropriate to the type of the disk can be realized only by a magnetic repulsive force. Therefore, the amount of the electric current to be supplied to a coil for generating an electromagnetic force can be reduced so as to decrease power consumption. Since a smaller amount of heat is generated by the coil, a smaller amount of heat is conveyed to the lens or lenses, resulting in reduction in adverse optical effect on the lens or lenses. Since the thrust for moving the holder can be reduced, a magnetic circuit can be more compact so as to decrease the size of the optical pickup apparatus. A reduction in the weight of the coil allows the holder to be moved faster.

In one embodiment of the invention, a magnetic repulsive force acts while the holder is moved during an optical system switching operation or when the holder is not moving in a direction perpendicular to the optical axis. Therefore, the vibration of the holder generated in the direction of the optical axis for positioning the holder in place can be reduced, so as to prevent collision between the disk and the holder or between the disk and the lens caused by the vibration.

In one embodiment of the invention, the holder is moved by a magnetic attractive force. Accordingly, a magnet provided on the holder can be replaced with a member formed of a material which is attracted by the magnet, for example, a low-cost material such as iron. Thus, the production cost of the optical pickup apparatus can be reduced.

In one embodiment of the invention, a magnetic attractive force acts while the holder is moved during an optical system switching operation or when the holder is not moving in a direction perpendicular to the optical axis. Therefore, the vibration of the holder generated in the direction of the optical axis for positioning the holder in place can be reduced, so as to prevent collision between the disk and the holder or between the disk and the lens caused by the vibration.

In one embodiment of the invention, when a disk is mounted on the optical pickup apparatus, the distance between the disk and the holder in the direction of the optical axis can be made sufficiently large to prevent collision between the disk and the holder or between the disk and the lens.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup apparatus, comprising:
    a first optical system for recording or reproducing signals to or from a first optical recording medium;
    a second optical system for recording or reproducing signals to or from a second optical recording medium;
    a holder for accommodating the first optical system and the second optical system on substantially the same plane;
    a focusing driving device for moving the holder in a first direction parallel to an optical axis of the first optical system and the second optical system;
    a tracking driving device for rotating the holder in a second direction perpendicular to the optical axis of the first optical system and the second optical system;
    a switching device for placing the first optical system on an optical path for recording or reproducing signals to or from the first optical recording medium, and for placing the second optical system on the optical path for recording or reproducing signals to or from the second optical recording medium; and
    a variable distance driving device for varying a distance between the first optical recording medium and the first optical system from a distance between the second optical recording medium and the second optical system when one of the first optical system and the second optical system is switched to the other optical system,
    wherein the variable distance driving device drives the holder in a direction of the optical axis in order to vary the distance using at least one of a magnetic repulsive force and a magnetic attractive force between at least one permanent magnet and another permanent magnet or magnetic member.

2. An optical pickup apparatus according to claim 1, wherein the variable distance driving device drives the holder in the direction of the optical axis by a magnetic repulsive force.

3. An optical pickup apparatus, comprising:
    a first optical system for recording or reproducing signals to or from a first optical recording medium;
    a second optical system for recording or reproducing signals to or from a second optical recording medium;
    a holder for accommodating the first optical system and the second optical system on substantially the same plane;
    a focusing driving device for moving the holder in a first direction parallel to an optical axis of the first optical system and the second optical system;
    a tracking driving device for rotating the holder in a second direction perpendicular to the optical axis of the first optical system and the second optical system;
    a switching device for placing the first optical system on an optical path for recording or reproducing signals to or from the first optical recording medium, and for placing the second optical system on the optical path for recording or reproducing signals to or from the second optical recording medium; and
    a variable distance driving device for varying a distance between the first optical recording medium and the first optical system from a distance between the second optical recording medium and the second optical system when one of the first optical system and the second optical system is switched to the other optical system,
    wherein the variable distance drive device drives the holder in the direction of the optical axis by the magnetic repulsive force when the holder is not moving in the second direction or when one of the first optical system and the second optical system is switched to the other optical system.

4. An optical pickup apparatus according to claim 1, wherein the variable distance driving device drives the holder in the direction of the optical axis by a magnetic attractive force.

5. An optical pickup apparatus comprising:
    a first optical system for recording or reproducing signals to or from a first optical recording medium;
    a second optical system for recording or reproducing signals to or from a second optical recording medium;
    a holder for accommodating the first optical system and the second optical system on substantially the same plane;
    a focusing driving device for moving the holder in a first direction parallel to an optical axis of the first optical system and the second optical system;
    a tracking driving device for rotating the holder in a second direction perpendicular to the optical axis of the first optical system and the second optical system;
    a switching device for placing the first optical system on an optical path for recording or reproducing signals to or from the first optical recording medium, and for placing the second optical system on the optical path for recording or reproducing signals to or from the second optical recording medium; and a variable distance driving device for varying a distance between the first optical recording medium and the first optical system from a distance between the second optical recording medium and the second optical system when one of the first optical system and the second optical system is switched to the other optical system, wherein the variable distance driving device drives the holder in the direction of the optical axis by the magnetic attractive force when the holder is not moving in the second direction or when one of the first optical system and the second optical system is switched to the other optical system.

6. An optical pickup apparatus, comprising:

a first optical system for recording or reproducing signals to or from a first optical recording medium;

a second optical system for recording or reproducing signals to or from a second optical recording medium;

a holder for accommodating the first optical system and the second optical system on substantially the same plane;

a focusing driving device for moving the holder in a first direction parallel to an optical axis of the first optical system and the second optical system;

a tracking driving device for rotating the holder in a second direction perpendicular to the optical axis of the first optical system and the second optical system;

a switching device for placing the first optical system on an optical path for recording or reproducing signals to or from the first optical recording medium, and for placing the second optical system on the optical path for recording or reproducing signals to or from the second optical recording medium; and a variable distance driving device for varying a distance between the first optical recording medium and the first optical system from a distance between the second optical recording medium and the second optical system when one of the first optical system and the second optical system is switched to the other optical system, wherein the variable distance driving device pauses the holder when the first optical recording medium or the second optical recording medium is mounted on the optical disk apparatus such that a distance from the recording medium to the holder is larger than a prescribed distance from the second recording medium to the holder when the second optical system is located in the optical path.

7. An optical pickup apparatus, comprising:

a first optical system for recording or reproducing signals to or from a first optical recording medium;

a second optical system for recording or reproducing signals to or from a second optical recording medium;

a holder for accommodating the first optical system and the second optical system on substantially the same plane;

a focusing driving device for moving the holder in a first direction parallel to an optical axis of the first optical system and the second optical system;

a tracking driving device for rotating the holder in a second direction perpendicular to the optical axis of the first optical system and the second optical system;

a switching device for placing the first optical system on an optical path for recording or reproducing signals to or from the first optical recording medium, and for placing the second optical system on the optical path for recording or reproducing signals to or from the second optical recording medium; and a variable distance driving device for varying a distance between the first optical recording medium and the first optical system from a distance between the second optical recording medium and the second optical system when one of the first optical system and the second optical system is switched to the other optical system, wherein the variable distance driving device varies the distance based primarily on a non-electrically generated force.

* * * * *